Aug. 8, 1967 B. V. RHODES ET AL 3,334,485
RAMJET POWERED CRAFT
Filed July 26, 1962 3 Sheets-Sheet 1

BARRY V. RHODES
DANIEL E. BLOXSOM
INVENTORS

BY

ATTORNEY

BARRY V. RHODES
DANIEL E. BLOXSOM
INVENTORS

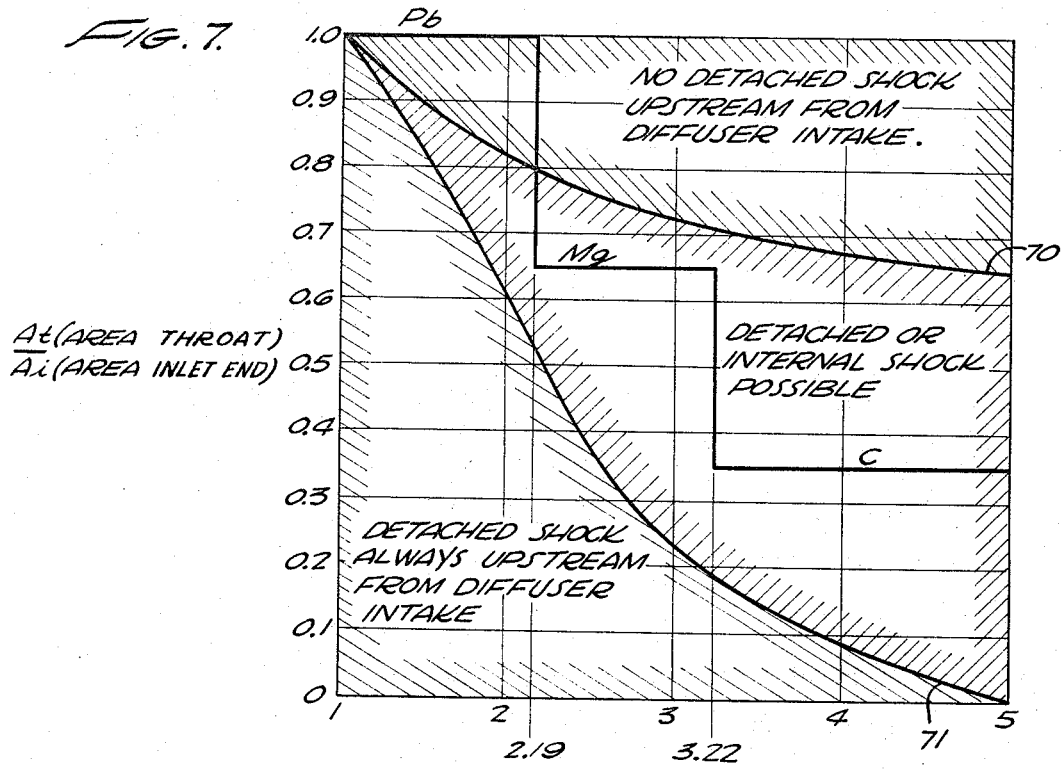
FIG. 7.
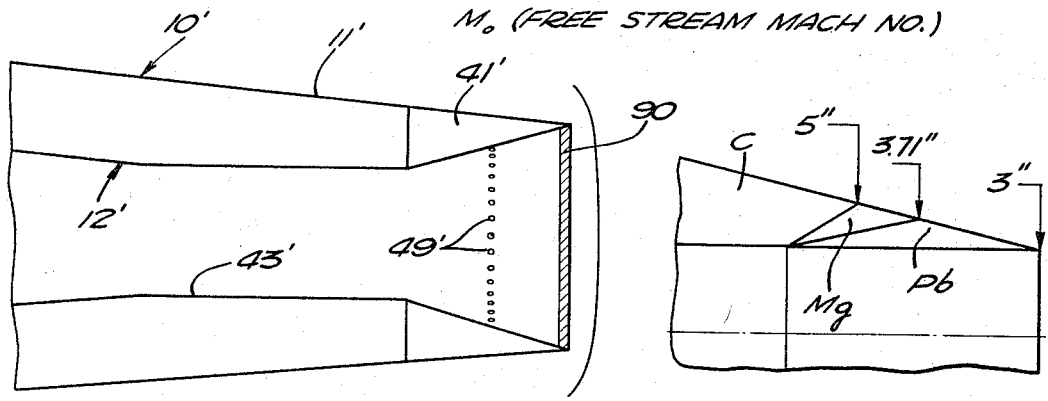
FIG. 6.
FIG. 8.
| T STAG. °K | M# | MAT'L | INLET RADIUS DURING LAUNCHING |
|---|---|---|---|
| 589 | 2.19 | Pb | 3.00 |
| 924 | 3.22 | Mg | 3.11 |
| 4000 | 12 | C | 5.00 |
FIG. 9.
BARRY V. RHODES
DANIEL E. BLOXSOM
INVENTORS
BY
ATTORNEY

United States Patent Office 3,334,485
Patented Aug. 8, 1967

3,334,485
RAMJET POWERED CRAFT
Barry V. Rhodes, 22358 Baltar St., Canoga Park, Calif. 91304, and Daniel E. Bloxsom, 523 S. Lucerne, Los Angeles, Calif. 90005
Filed July 26, 1962, Ser. No. 212,581
13 Claims. (Cl. 60—208)

This invention relates generally to high altitude aircraft and more particularly to an improved high speed aircraft, missile, projectile or the like designed to fly at hypersonic velocities and to be propelled by a ramjet propulsion system.

Supersonic combustion ramjet-powered projectiles and other airborne vehicles under development at the present time are characterized by their inability to develop thrust forces in excess of drag losses thereby permitting the craft to maneuver or to climb under power developed within the vehicle system.

Ramjet power plants essentially comprise a contoured stovepipe and produce thrust by the reaction of the hot products of combustion escaping rearwardly from the trailing end of the pipe while the latter is traveling forwardly at a sufficient velocity to compress a requisite quantity of combustion air entering an inlet diffuser at the leading end of the pipe. Among the many operating problems presented is that of maintaining combustion with a forward rate of flame propagation in excess of the velocity of the oppositely-flowing compressed air passing through the combustion chamber. A second problem involves accelerating the craft or ship to its operating velocity under conditions permitting the shock wave to be swallowed by the inlet diffuser. Various expedients have been resorted to heretofore in an effort to induce the shock wave to enter and pass through the throat of the duct into the combustion chamber. Another serious problem has been the design of a combustion chamber capable of utilizing the available thermal energy efficiently and effectively to thrust the ship forward with a force exceeding drag losses. Another problem has been that of supplying fuel to the combustion chamber at the requisite pressure without need on the ship for complex pumping and pressure control auxiliaries.

The resolution of the foregoing problems and factors of critical importance in the design of the ship, taken individually as well as in combination with one another, is greatly complicated by the fact that reliable conclusions should be based on actual test conditions conducted under the contemplated operating conditions both as respects the ambient environment and the relative speed of the ship in that environment. Critical factors of the present ship as disclosed in this application have been evolved and checked under actual tests conducted in an appropriate wind tunnel operated to simulate actual flight conditions at hypersonic velocities and at high altitudes.

The resulting ship design is characterized by its marked simplicity and the fact that it embodies appropriate provision for resolving the many serious problems so frustrating to other designers in this field. The very simple components of the present design cooperate with one another to provide a ship operating with a positive thrust in excess of drag losses and with an efficiency of approximately 50 percent.

Basically, the duct-like ship comprises a long frusto-conical main body having an unobstructed through passage from end-to-end thereof including a relatively short inlet diffuser, a throat section, and a long outlet diffuser extending from the trailing end of the throat to the trailing end of the main body. The fuel supply, desirably hydrogen, is charged under pressure into the hollow main body and is introduced into the air passage through inlet nozzles opening through the side wall of the inlet diffuser near its leading end and having axes converging along paths intersecting at a high pressure, high temperature, self-igniting zone or hot spot within the duct throat. These fuel jets are supplied through injectors located within the end of the ship. The simple fuel supply system preferably includes suitable automatic provision, as acceleration responsive means, for initiating fuel flow through the nozzles as the ship approaches a self-propelling operating speed.

The leading end of the ship is provided with a specially constructed extension designed to ablate or decay from the heat of friction generated during acceleration produced by a suitable launching device. The ablating extension is so designed as to swallow the shock wave generated by the leading end of the duct during launching of the ship. The ablating characteristics of the material forming the extension are so selected that the angle of the inlet passage gradually develops or widens after the shock wave has been conducted through the throat with the result that ablation of the extension becomes substantially complete as the acceleration phase of launching approaches terminal conditions. At this time, the fuel nozzles are activated to jet fuel into the hot compressed air flowing through the throat with the result that auto-ignition occurs to create high-temperature high-pressure conditions rearwardly of the throat.

Owing to the properly designed long, acutely-tapering outlet diffuser design, the rearwardly advancing hot products of combustion are maintained in high efficiency contact with the rearwardly diverging walls of the outlet diffuser and are effective on this outlet diffuser to thrust the ship forward with a resultant thrust substantially in excess of the drag losses. It is found that by appropriate selection of the flare angle of the outlet diffuser taken with its length extending over substantially the full length of the ship's central passage that the boundary layer of the hot products of combustion remains in pressure contact with the wall of the outlet diffuser and that there is no or a minimum separation of the boundary layer from pressure contact with the diffuser surface at any time.

Accordingly, it is a primary object of the present invention to provide an aero thermodynamic duct featuring unusual structural simplicity, light-weight, high fuel carrying capacity and producing a thrust force in excess of the drag losses under hypersonic flying conditions.

Another object of the invention is the provision of an aero thermodynamic duct featuring an air passage extending from end-to-end thereof substantially free of obstructions throughout its length, including the inlet to its leading end, and having a self-eliminating facility in its leading end designed to facilitate swallowing of the shock wave during acceleration to an appropriprate engine starting velocity before becoming dissipated.

Another object of the invention is the provision of an aero thermodynamic duct having an ablating extension secured initially to its leading end and designed to ablate and disappear as an incident to the launching of the duct to its operating velocity.

Another object of the invention is the provision of an aero thermodynamic duct having a substantially unobstructed air passage extending from end-to-end thereof and characterized by a relatively short, wide angle inlet diffuser, a throat and a relatively long, small angle outlet diffuser extending from the trailing end of the throat substantially throughout the remaining length of the duct.

Another object of the invention is the provision of an aero thermodynamic duct designed to operate with presurized hydrogen fuel stored under pressure in an annular storage tank surrounding the main air passage and arranged to discharge the fuel into the throat in a plurality of jets emanating from the interior side wall of the inlet diffuser forwardly of the throat area.

Another object of the invention is the provision of an aero thermodynamic duct having a specially designed ablating extension in its leading end having a central passage therethrough of substantially the same area and shape as the throat of the duct and formed of materials selected to ablate through the heat of friction generated during acceleration of the duct toward operating speed, said extension comprising layers of material arranged to ablate to form a converging inlet diffuser of gradually increasing taper as ablation progresses during acceleration.

These and other more specific objects will appear upon reading the following specification and claims and upon considering in connection therewith the attached drawings to which they relate.

Referring now to the drawings in which a preferred embodiment of the invention is illustrated:

FIGURE 6 is a schematic view of the aero thermodynamic duct but having a frangible diaphragm mounted across the mouth of the inlet diffuser;

FIGURE 7 is a graphic portrayal of shock wave conditions prevailing during acceleration of the duct and using different ratios of throat to inlet area of the duct;

FIGURE 8 is a graphical representation of exemplary dimensions for the ablating inlet diffuser extension member; and FIGURE 9 is a table containing design information useful in the design and construction of the ablating extender for the inlet diffuser.

Figure 1:
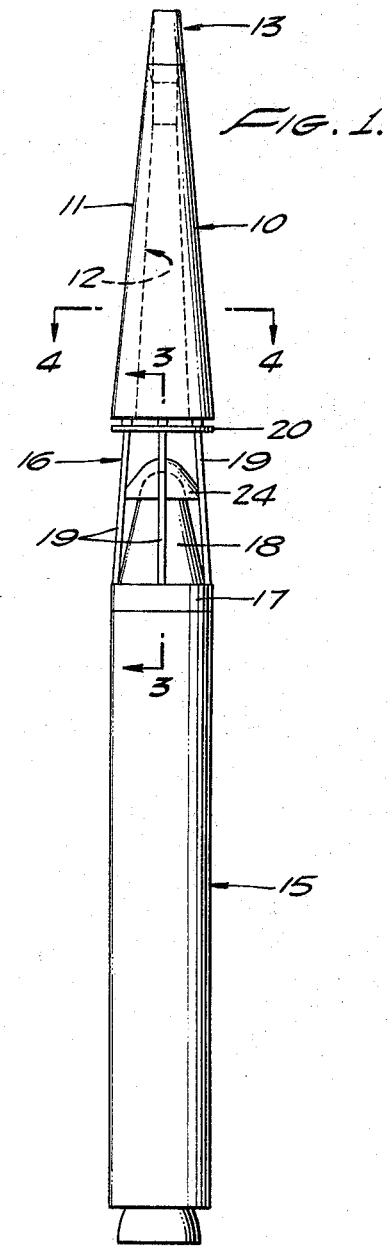
FIGURE 1 is an overall side view of an aero thermodynamic duct assembled to a launching rocket in readiness to be launched.

Referring more particularly to FIGURE 1, there is shown a preferred embodiment of an aero thermodynamic duct designated generally 10 incorporating the features of this invention and including as the principal component a ramjet propulsion engine. The duct or airship 10 includes an outer casing 11 diverging at a small angle rearwardly and including a central passageway 12 extending from end to end thereof. Suitably secured within the inlet or leading end of the ship is a generally tubular extension 13 of special construction adapted to ablate from the heat of friction during the launching operation of the ship and effective to swallow the shock wave forming in front of the ship as the flight velocity increases.

Figure 3:
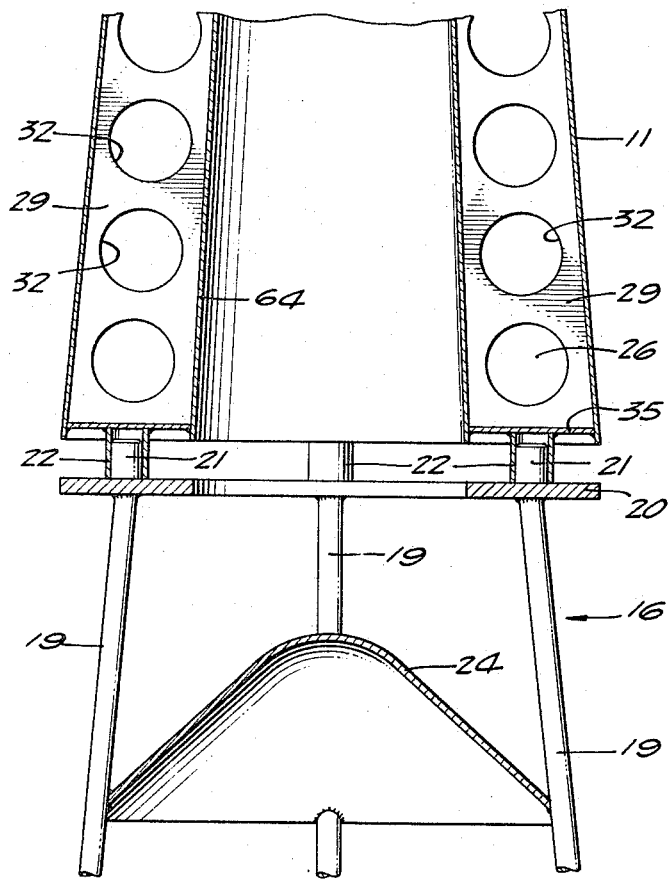
FIGURE 3 is a longitudinal sectional view with portions broken away and taken along line 3—3 on FIGURE 1 to shown details of the separable connection between the aero thermodynamic duct and the nose end of the launching rocket.
Figure 5:
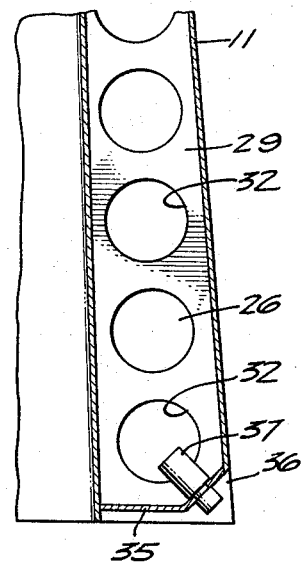
FIGURE 5 is an enlarged fragmentary sectional view through the trailing end of a fuel storage tank for the duct.
Figure 4:
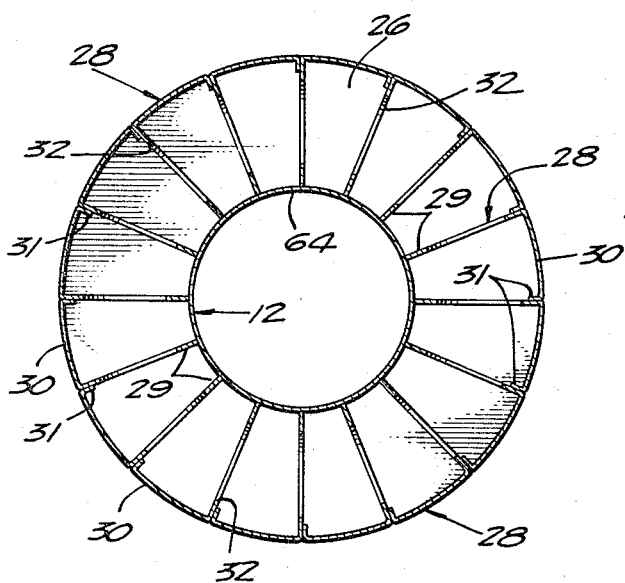
FIGURE 4 is a cross sectional view through the main body of the duct taken along line 4—4 on FIGURE 1.

Suitably detachably secured to the trailing or larger end of ship 10 is a launching device 15 such as a rocket engine held axially spaced from the rear of ship 10 by a spacer strut unit 16 having the constructional details shown in FIGURE 3. Launching device 15 may be of any suitable construction and may be launched from a conventional type launching facility capable of accelerating ship 10 to a velocity at which its own power plant becomes operative and effective to take over the further acceleration and powered operation of the craft.

The details of the connecting strut assembly 16 as illustrated in FIGURE 3 include a ring 17 attachable to the base of the pointed end 18 of rocket 15. Desirably, ring 17 includes means for securing it rigidly to the launching rocket. Converging upwardly from base ring 17 are a plurality of struts 19 secured at their upper ends to a connecting ring 20. Projecting outwardly and axially from the opposite face of ring 20 are locater bosses 21 having a loose telescoping fit within sleeves 22 welded or otherwise securely fixed to the main body of ship 10. There is preferably secured to an intermediate portion of struts 19 a conical deflector 24 effective to divert the flow of fluids from the rear end of passage 12 outwardly away from nose 18 of rocket 15. A particular additional function of deflector 24 comprises that of providing a reaction member against which the fluid issuing from the rear of ship 10 impinges to assure separation of the launching rocket and strut assembly 16 from ship 10 as the power plant of the latter starts and becomes effective to propel ship 10.

The aero thermodynamic duct or ship 10 preferably includes the constructional features now to be described and best illustrated in FIGURES 2 to 5. The main body of this ship is fabricated from suitable high strength, light weight metals, as for example alloy aluminum, magnesium, stainless steel and others. The concentrically arranged inner and outer shells 11 and 12 diverge rearwardly along generally similar angles of taper and cooperate with one another to provide an intervening annular storage chamber 26 a major portion of which is utilized to store fuel, although it is to be understood a portion of this space can be used for cargo or a crew compartment in larger embodiments of the invention ship.

According to a preferred high-strength design, inner shell 12 is assembled first. Thereafter, long generally L-shaped members 28 (FIGURE 4) are assembled about the exterior of shell 12. These members include a radially disposed leg 29 the free end edge of which is welded to the exterior of shell 12 so as to lie normal thereto. The second or shorter leg 30 of members 28 is curved to lie in a tapering surface of revolution about the axis of shell 12 and desirably includes an inturned lip 31 lying flush against the side wall of leg 29 of the adjacent member 28. Each of the inturned lips 31 is securely welded to the adjacent member. It will also be understood that legs 29 preferably include cutouts 32 to reduce the weight of the ship.

The rear ends of shells 11 and 12 are closed by an end ring 35 welded in place in the manner suggested in FIGURE 3, the sleeves 22 being welded to the exterior face of the closure ring. Portion 36 of ring 35 is deformed in the manner suggested in FIGURE 5 and has suitably mounted thereon a fuel charging fitting 37. This arrangement avoids risk of injury to the charging fitting 37 during handling and launching of the ship. While not illustrated, it will be understood that the exterior shell 11 includes a layer or coating of cryogenic insulation.

The foremost end of the main body is provided with an end ring 40 which may form part of the engine nose ring 41. Desirably, nose ring 41 is formed of material highly resistant to ablation by the heat of friction, as for example, carbon or graphite, and is generally triangular in cross section. Its exterior surface forms a continuation of the outer surface of the rearwardly diverging outer shell 11 whereas its inner surface 42 converges inwardly to a junction with throat 43. The angle of taper of surface 42 is of importance, the angle depending upon the particular operating conditions for which the ship is designed. For operation at hypersonic velocities, a taper of approximately 15 degrees to the axis of passage 12 is found to provide excellent results. It is important that the forwardly converging inner and outer surfaces of nose ring 41 merge in a sharp edge having a thickness of approximately one mil, thereby facilitating the passage of the air along the inner and outer surfaces of the nose ring and avoiding turbulence.

Embedded within nose ring 41 are a plurality of fuel injector nozzles 45 having their rear ends rigidly secured about fuel supply ports 46 opening into a fuel distributing manifold 47 secured to end ring 40. Each of the fuel injector nozzles 45 have outlet ports 49 the axes of which converge inwardly as is indicated by the dot-and-dash lines 50. These axes converge at the axis of throat 43 and preferably within the leading end of this throat. At this point of convergence, the temperature of the inflowing compressed air is sufficiently high to ignite the converging streams of fuel thereby avoiding the need for an igniter as well as turbulence and interference in the high velocity, pressurized air stream flowing through passage 12.

The charge of pressurized fuel contained within storage compartment 26 preferably comprises hydrogen charged to an initial pressure at launching of approximately 500 p.s.i. Initially, flow of this fuel into distributing manifold 47 is blocked by a closure device 52 shown here as mounted on manifold 47. Device 52 includes a generally cylindrical chamber closed at its outer end by a frangible diaphragm 53. Reciprocally supported in this chamber is a disc-like mass 54 secured to a pointed stem 55 and normally held retracted against the foremost end of the chamber by a calibrated spring 56. The mass of member 54 and the strength of spring 56 are so selected that the pointed end of stem 55 is effective to pierce the diaphragm 53 and release the fuel into manifold 47 through duct 57 as an incident to the acceleration of the ship by the rocket during the launching operation.

The fuel supply facilities also preferably include a pressure relief valve 60 secured to manifold 47 and having its inlet port normally closed by a spring pressed valve 61. Should the internal pressure of the fuel tank exceed a safe pressure, it will be understood that valve 61 opens to release the fuel to injector devices 45 until the fuel pressure has been reduced to a safe value whereupon the relief valve recloses preventing further escape of fuel.

Reference has been made above to the principal design factors employed in the construction of nose ring 41. In addition, it is pointed out that the smaller diameter inner end of conical surface 42 merges smoothly with the inlet end of the cylindrical throat section 43. Conical surface 42 will therefore be understood as forming the inlet diffuser of the engine and is effective to compress the inflowing air prior to its entry into throat 43. The length of this throat differs according to the conditions under which the engine is designed to operate. In general, it is pointed out that if the ship is designed for high flight conditions the throat is relatively long in comparison to its length when designed for low height flight.

The rear end of throat 43 merges smoothly and directly with the smaller diameter end of the outlet diffuser. Contrary to the practice followed in prior ramjet engine designs, the outlet diffuser extends substantially the full length of the ship or from the rear end of throat 43 to the rear end ring 35 of the main body. Accordingly, the reaction forces resulting from the rearwardly-flowing hot high-pressure air and combustion products are effective for propulsion purposes throughout upon the full axial length of outlet diffuser 64. For the most effective and efficient results the angle of taper of outlet diffuser 64 is highly important in terms of conversion of a maximum quantity of the available energy in the hot gases generated within this diffuser into useful propulsion energy. Actual tests made on a model of the described aero thermodynamic duct illustrated and described herein indicate that a taper of 5 to 6 degrees relative to the axis of passage 12 is highly effective for hypersonic velocity flight conditions at an altitude of 75,000 to 110,000 feet. The most efficient results at other speeds or at lower altitudes may necessitate taper angles of different values of either side of the mentioned range and such variances of the angle of taper for the outlet diffuser are to be understood as falling within the scope of the claims which form part of this application.

Typical temperatures and pressures exemplary of operating conditions within air passage 12 during tests simulating flight at 10,000 feet altitude are as follows. The air pressure in the plane of the entrance to the inlet diffuser were 88 p.s.i. whereas at the throat entrance, the pressure had increased to 390 p.s.i. Within the throat and the initial burning zone the pressure was approximately 1300 p.s.i. and the temperature was about 3000° Kelvin. Both the pressure and temperature drop axially of the outlet diffuser, the pressure dropping to the vicinity of 75 p.s.i. at the midpoint of this diffuser and to about 14 p.s.i. as the gases emerge at a temperature of about 1500° Kelvin.

Figure 2:
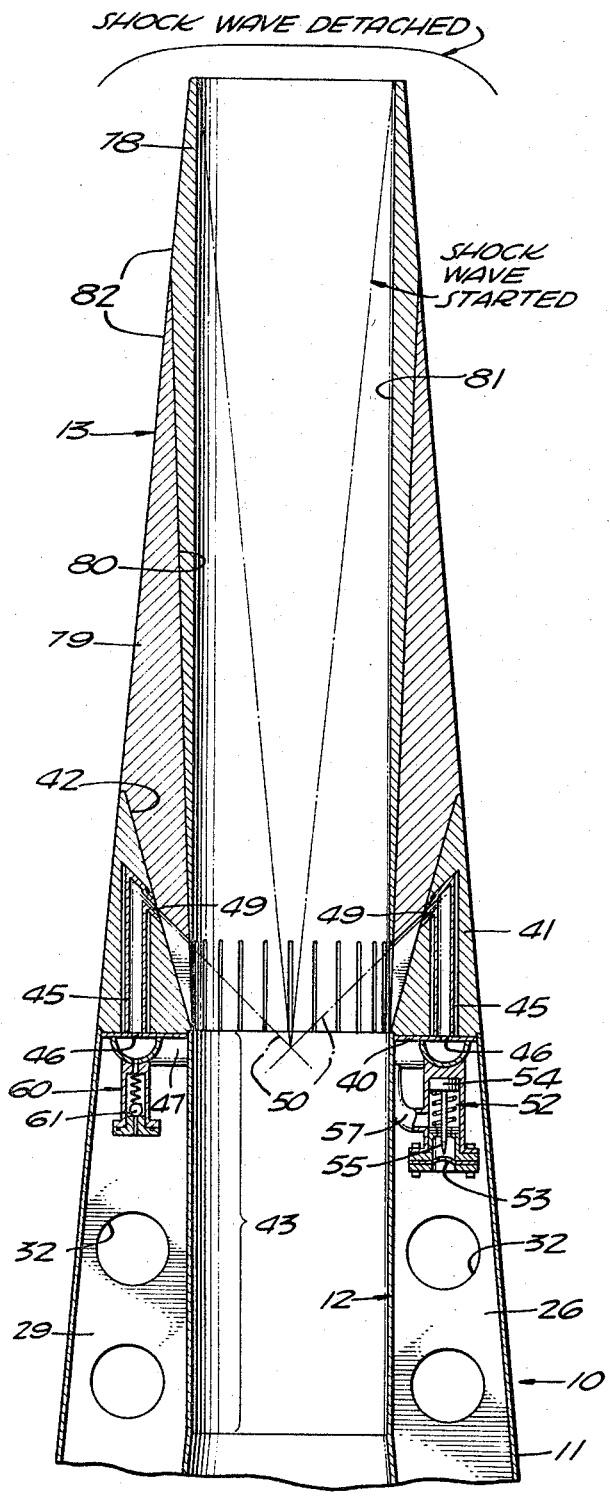
FIGURE 2 is an enlarged sectional view through the nose of the duct.

The launching of the described ship and initiation of combustion is found to be greatly facilitated if not dependent upon the presence of a suitable expedient to initiate swallowing of the shock wave generated forwardly of the inlet diffuser as it is launched, the tubular extender assembly 13 now to be described with particular reference to FIGURES 2 and 8 being a particularly satisfactory expedient serving this purpose. It is well known that great difficulty is experienced in inducing the initial air flow through the central passage 12 of a ramjet engine owing to the reluctance of the shock wave created ahead of the craft while being accelerated to operating velocity to enter and pass through the inlet diffuser. Various expedients have been proposed heretofore for dealing successfully with this problem. The present invention contemplates the use of the tubular extender 13 preferably formed from laminated layers of material selected to ablate in response to the heat of friction flowing thereover during launching.

Before describing the construction of member 13 in greater detail, reference will be made to FIGURE 7 showing design factors at the leading end of the ship and their effect on inducing the shock wave to enter or be swallowed by the throat of passage 12. FIGURE 7 shows a pair of curves 70, 71 plotted with respect to flight velocity of the ship, $M_o$ as one coordinate, and to the ratio of the throat diameter to the inlet diameter of the inlet diffuser 42 and throat 43 as the other coordinate. The ratio of the throat area to the inlet area at the leading end of diffuser 42 is shown plotted vertically along the left-hand margin of FIGURE 7, whereas the flight velocity $M_o$ is shown plotted horizontally along the bottom of the figure. Under launching conditions represented above curve 70, it is known that there is no detached shock upstream from the diffuser intake. For launching conditions between curve 70 and 71 there will be a detached or swallowed shock depending on previous flow history. For flight conditions below curve 71, there is always a detached shock upstream from the diffuser intake.

Inasmuch as desired ramjet propulsion efficiencies are obtainable only when throat to inlet area ratios are of the order of 0.36, it will be recognized that considerable difficulties are experienced in having the ramjet swallow the shock wave to permit starting the engine. It is essential that some expedient be adopted to initiate air flow rearwardly through the inlet diffuser and past the throat. If flow can be initiated by the use of some expedient, it is found that the flow through the inlet diffuser is stable and dependable so long as the air velocity is at least Mach 2.6 or higher including an infinitely large Mach number.

FIGURE 2 indicates the detached shock wave as being generally saucer shaped and as capping the leading end of the craft 10, whereas the dot and dash lines converging from the leading lip edge of the engine and merging at the entrance to the throat represent a shock wave swallowed by an inlet diffuser equipped with one preferred engine starting expedient and having the features illustrated in FIGURES 2 and 8.

The tubular shock wave swallower extension 13 shown in FIGURE 2 includes an inner layer 78 and an outer layer 79 nested together along the rearwardly converging conical interface 80. The inner surface 81 of layer 78 desirably has the same cross sectional area and shape as cylindrical throat 43 and the exposed outer surfaces 82 of both layers diverge rearwardly to lie in the same surface of revolution as outer shell 11. To be observed is the fact that both layers 78 and 79 are of variable thickness lengthwise of the layers and each includes a forwardly converging outer surface as well as a rearwardly converging surface. Of importance is the fact that the rearwardly converging surface of each layer lies at a different angle with respect to the axis of passage 12, these surfaces representing a gradually increasing angle of taper of the inlet diffuser which forms by ablation of the material in layers 78, 79 during acceleration of the ship to operating velocity. Initially, the surface of the inlet formed by the inner layer 78 is cylindrical to facilitate swallowing of the shock wave. As acceleration increases and the heat of friction tends to ablate the inner surface, the taper of the inlet diffuser thereby formed gradually increases until ablation of all layers of the extender becomes complete thereby exposing the permanent surface of inlet diffuser 42.

A suitable material for layer 78 is lead, whereas layer 79 may comprise magnesium. Either layer may consist of an alloy having a melting point of a desirable value such that it ablates at the temperatures produced by the heat of friction during acceleration. Table 9 taken with FIGURE 7 indicates the stagnation temperature of the airstream in degrees Kelvin prevailing at different Mach numbers during launching and the fact that the indicated materials of the different layers of the extender member will ablate under these temperature conditions. The changing radial dimensions of the inlet end of the inlet diffuser occuring during ablation are listed in the last column of FIGURE 9, it being pointed out that the first listed dimension corresponds substantially to the permanent radius of engine throat 43. From these figures it will be recognized that the heat of friction gradually ablates the leading surfaces of extender 13 to increase the interior taper angle of the inlet diffuser as the velocity of craft 10 increases, the entire extender having become ablated by the time the craft attains an operating speed of the order of Mach 12.

FIGURE 6 illustrates schematically a second preferred starter expedient, it being pointed out that only the leading end of the craft is there shown. A suitable frangible diaphragm 90 is there shown supported across air passage 12' through the engine. Although the diaphragm is shown across the inlet of the inlet diffuser, it may be mounted elsewhere as, for example, across the outlet of the inlet diffuser.

Diaphragm 90 is formed of any suitable material and is designed to fail abruptly and completely as the pressure differential across the diaphragm reaches a value indicative of a craft velocity in excess of Mach 2.6 or any other value known to be appropriate for a particular engine design to swallow the shock wave.

In this connection it is pointed out that the presence of frangible diaphragm 90 across the inlet diffuser taken in concert with the launching velocity of the craft causes a pressure reduction interiorly of the air passage rearwardly of the diaphragm and a pressure build up forwardly thereof. The resulting pressure differential increases as the craft velocity increases. As the diaphragm suddenly bursts, the ensuing impulse conditions are found highly effective in initiating air flow and the swallowing of the shock wave. Stable flow conditions continue so long as the relative Mach number of the air remains above the critical value.

The convergence of the conical swallowed shock wave at or within the throat is found to provide a highly effective flame stabilizer, this function being facilitated by the impingement and delivery of the fuel to this crucial zone and the auto ignition thereof by reason of the high temperatures naturally prevailing within the throat of the air passage. Local flow temperatures of approximately 1200° F. assure ignition of the fuel and, in fact are essential to the combustion of hydrogen fuel sufficiently rapidly for utilization in a ramjet craft.

A constant geometry ramjet engine of the type described herein permits the flow in the engine to go supersonic at high Mach numbers. This is important to minimize thermodynamic losses and high heat transfer on the engine.

While the particular ramjet powered craft hereinshown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:
1. An aero thermodynamic duct comprising an elongated tubular main body having an open-ended tubular passage therealong substantially free of flow-restricting obstruction from end to end thereof both during launching and powered flight of said duct, said elongated tubular passage including a relatively short constant-angle converging inlet diffuser opening into an elongated tubular throat adjacent the forward end of said duct and a long relatively small-angle rearwardly diverging thrust-producing outlet diffuser extending from said throat to the trailing end of said passage, the taper angle of said inlet diffuser being substantially greater than the taper angle of said outlet diffuser, means for jetting fuel into the throat of said passage through the side walls of said inlet diffuser, and said inlet diffuser and throat being proportioned to maintain supersonic combustion substantially throughout the length of said throat so long as a proper fuel-air mixture is supplied thereto and to provide a compression ratio of the precombusted mixture in the vicinity of 5 thereby to raise the temperature thereof sufficiently to auto-ignite the fuel-air mixture in the leading end of said throat.

2. An aero thermodynamic duct as defined in claim 1 characterized in the provision of means maintaining said fuel jetting means normally closed and responsive to open under predetermined conditions incident to flight launching of said duct to initiate the supply of fuel through said fuel jetting means and into said throat after said duct has attained a predetermined flight velocity.

3. An aero thermodynamic duct as defined in claim 1 characterized in that said means for jetting fuel into said inlet diffuser are located outwardly of the interior surface of said inlet diffuser and opening therethrough in a direction to jet separate streams of fuel into said passage so as to converge toward one another in a hot spot along the axis of said duct and in an area of supersonic air flow adjacent the leading end of said throat.

4. An aero thermodynamic duct type aircraft having a long tubular main body provided with a nonflexible-walled central passage therethrough free of flow-restricting obstructions from end to end thereof, the exterior of said main body tapering and diverging rearwardly from the inlet end thereof, said central passage having an elongated generally tubular throat spaced inwardly of the leading end of said duct, a forwardly diverging inlet diffuser between the leading end of said throat and the leading end of said duct effective to compress air by a factor in the vicinity of 5 times and to channel this compressed air into said throat, a long gently tapering outlet diffuser having an unobstructed outlet opening directly to the atmosphere and diverging from the trailing end of said throat substantially to the trailing end of said main body at an angle substantially smaller than the taper angle of said inlet diffuser, said outlet diffuser providing the thrust-producing reaction surface against which the combustion gases press while passing rearwardly therealong and effective to propel said duct forwardly at high velocity, said main body having fluid fuel storage means operatively connected therewith, and means for jetting fuel from said storage means into a hot spot at the leading end of said throat for auto-ignition under supersonic flow combustion conditions to produce stable and sustained supersonic burning gases in said throat and continuing into and along said outlet diffuser.

5. An aero thermodynamic duct as defined in claim 4 characterized in that said main body is substantially hollow and effective to store pressurized hydrogen fuel therein.

6. An aero thermodynamic duct as defined in claim 5 characterized in that said hollow main body includes an inner diverging tubular member forming said outlet diffuser and an outer flaring member fabricated from a plurality of long high-strength members of L shape in cross section with a first leg thereof adapted to be disposed radially of said duct and the second leg being curved to lie in and form the outer conical surface of said main body, one end of said radial legs being fuse-bonded to the exterior surface of said outlet diffuser and the inturned free end of said second leg being fuse-bonded to the junction of said first and second legs of the adjacent one of said L-shaped members.

7. A combined spacecraft and ramjet propulsion plant adapted to be power-launched by auxiliary means to its own power-initiating speed substantially in excess of Mach 1 comprising, an elongated tubular main body of constant geometry having a centrally disposed venturi-shaped passage opening through the opposite ends thereof and having nonflexible interior walls, said venturi-shaped passage being free of obstructions and restrictions from end to end thereof interfering with the flow of air in fuel therethrough, the exterior of said main body tapering from a relatively small diameter leading end rearwardly past a throat portion of greater exterior diameter than said leading end to an appreciably larger diameter trailing end discharging directly to the outside atmosphere independently of restrictive nozzle means, the interior of said central passage having its minimum cross section or throat spaced close to but rearwardly of its leading end, smooth-surfaced frusto-conical like walls diverging respectively forwardly and rearwardly from said throat to the opposite ends of said central passage and the taper angle of said inlet diffuser being substantially greater than the taper angle of said outlet diffuser and effective to compress said fuel-air mixture by a factor of at least four times to auto-ignition temperature under supersonic combustion conditions within the entrance portion of said throat and to maintain supersonic combustion of said fuel-air mixture throughout the remainder of said throat and into the rearwardly diverging end of said venturi-shaped passage, means including means for jetting fuel into said inlet diffuser along rearwardly converging paths merging at the axis near the leading end of said throat and intermixing with air to produce said combustible air-fuel mixture.

8. An aero thermodynamic duct for power-sustained flight over wide-range supersonic velocities comprising an elongated main body having an open-ended tubular passage therethrough of constant geometry and free of flow-restricting obstructions from end to end thereof, said passage including a tubular throat of uniform cross-sectional area having a length in excess of its diameter and opening at its leading end into the smaller end of a relatively short rearwardly-converging inlet diffuser and opening at its outlet end into the smaller end of a relatively long rearwardly-diverging thrust-producing outlet diffuser having a substantially smaller taper angle than said inlet diffuser, means for supplying fuel rearwardly into the leading end of said throat from supply orifice means opening inwardly through the inner surface of said inlet diffuser, and said throat and said inlet and outlet diffusers being so proportioned relative to one another that supersonic combustion is initiated in a stable hot spot at the leading end of said throat and sustained therealong and into said outlet diffuser while the combustible mediums are flowing at very substantial supersonic or higher velocities.

9. An aero thermodynamic duct operable in power-sustained flight over wide-range supersonic or higher velocities and with auto-ignition and sustained combustion of a fuel and air mixture under very substantial supersonic combustion conditions, said duct being free of fuel supply means and flow-restricting obstructions in the path of flow from end to end thereof and including a generally cylindrical throat between and in axial alignment with a relatively long and small angle rearwardly-flaring outlet diffuser and with a relatively short and large angle inlet diffuser, the taper angle of said inlet diffuser being substantially greater than the taper angle of said outlet diffuser, the inlet and outlet cross-sectional areas of said inlet diffuser and of said throat being fixed and having a predetermined ratio such that said duct will retain an oblique shock swallowed while said duct is traveling at a velocity very substantially in excess of Mach 1, and means for introducing fuel into said inlet diffuser and thence into the leading portion of said throat for admixture with air in quantities to support stable sustained supersonic combustion at a generally stationary auto-ignition hot spot located in said throat at the tip of said oblique shock which combustion is sustained along said throat and into said outlet diffuser.

10. That method of producing thrust for an aero thermodynamic duct from power supplied by combustion occurring under supersonic flow conditions within the combustion zone of an open-ended tubular passage through said aero thermodynamic duct which tubular passage has an elongated tubular throat of uniform cross section interconnecting a relatively short wide-angle inlet diffuser and a relatively long narrow-angle outlet diffuser, said inlet diffuser supporting a tubular extension of fusible material having a throat-to-inlet area ratio of approximately unity, accelerating said aero thermodynamic duct axially through air to a supersonic velocity to create a converging oblique shock located within said tubular extension with its forward end at the forward end of said fusible tubular extension and its rear end positioned to create a hot spot of compressed air within said throat, decreasing said throat-to-inlet area ratio to a value substantially lower than unity, injecting fuel into said hot spot of compressed air, utilizing heat present in said hot spot of compressed air to auto-ignite said fuel within said throat under supersonic flow conditions, and continuing said supersonic combustion of fuel and air along the major length of said throat downstream from said hot spot and along said outlet diffuser while maintaining said expanding burning mixture in contact with the interior surfaces of said outlet diffuser to produce forwardly-acting axial thrust thereon adequate to maintain said duct in power-sustained flight at supersonic velocity.

11. That method defined in claim 10 characterized in the utilization of said oblique shock and the resulting supersonic flow combustion conditions existing within said throat downstream from the rear end of said oblique shock and of said hot spot as a flame holder for said burning fuel and air mixture.

12. That method defined in claim 10 characterized in the step of adding said fuel to air while flowing along said inlet diffuser and mixing said fuel with air undergoing compression and heating.

13. That method defined in claim 10 characterized in the step of compressing the air flowing along said inlet diffuser in advance of said hot spot by a factor of at least four times its pressure at the entrance to said diffuser, and further increasing the pressure of the combustible mixture of fuel and air in the zone of said hot spot by about ten times and its temperature to about 3000 degrees K.

(References on following page)

References Cited

UNITED STATES PATENTS

| | | | |
|---|---|---|---|
| 2,206,057 | 7/1940 | Skinner | 60—35.6 |
| 2,705,863 | 4/1955 | Clark et al. | 60—35.6 |
| 2,727,706 | 12/1955 | Heilig | 60—35.6 |
| 2,899,898 | 8/1959 | Goss | 60—35.6 |
| 2,992,527 | 7/1961 | Masnik et al. | 60—35.6 |
| 3,040,516 | 6/1962 | Brees | 60—35.6 X |
| 3,077,735 | 2/1963 | Johnson et al. | 60—35.6 |
| 3,143,401 | 8/1964 | Lambrecht | 60—35.6 X |

OTHER REFERENCES

"Combustion and Propulsion: High Mach Number Air-Breathing Engines," Fourth AGARD Colloquim, Jaumotte, A. L., et al. ed.; Pergamon Press, N.Y., 1961, pp. 77, 119, 154, and 172.

MARK NEWMAN, *Primary Examiner.*

ABRAM BLUM, SAMUEL LEVINE, W. A. SCHUETZ, D. HART, *Assistant Examiners.*